No. 883,628. PATENTED MAR. 31, 1908.
W. B. DAVIS.
COTTON CHOPPER.
APPLICATION FILED JAN. 2, 1908.
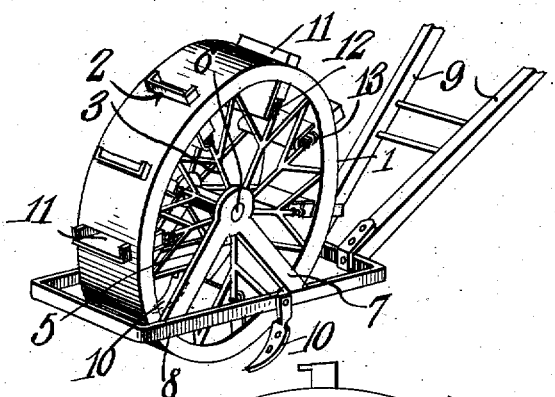
Fig.1.
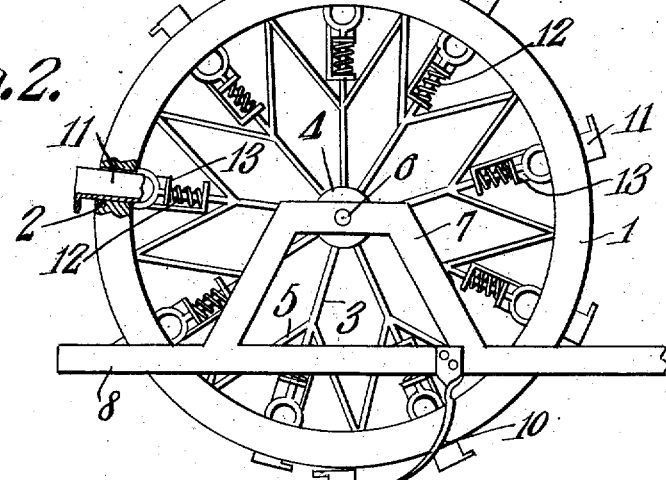
Fig.2.
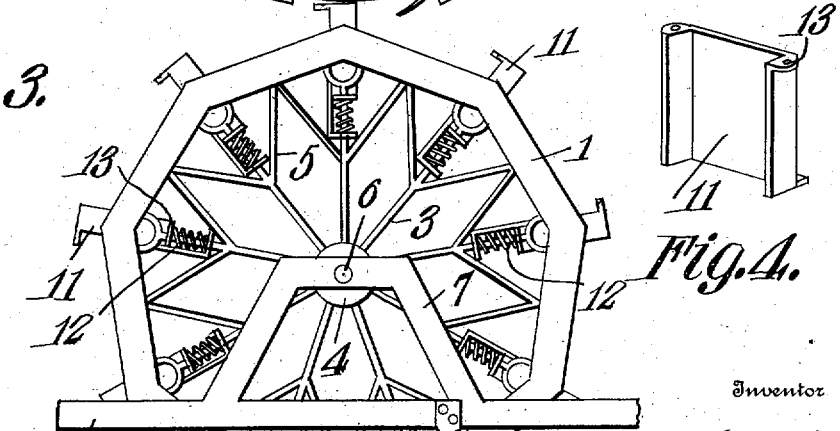
Fig.3.
Fig.4.
Witnesses
Inventor
William B. Davis.
By C. A. Snow & Co.
Attorneys

UNITED STATES PATENT OFFICE.

WILLIAM B. DAVIS, OF POPES FERRY, GEORGIA, ASSIGNOR OF ONE-HALF TO FRANK M. EWING, OF BOLINGBROKE, GEORGIA.

COTTON-CHOPPER.

No. 883,628.　　　Specification of Letters Patent.　　　Patented March 31, 1908.

Application filed January 2, 1908. Serial No. 409,006.

*To all whom it may concern:*

Be it known that I, WILLIAM B. DAVIS, a citizen of the United States, residing at Popes Ferry, in the county of Monroe and State of Georgia, have invented a new and useful Cotton-Chopper, of which the following is a specification.

This invention has relation to cotton choppers and it consists in the novel construction and arrangement of its parts as hereinafter shown and described.

The object of the invention is to provide an implement adapted to be used for the purpose of thinning out cotton in a row and which is so constructed as to leave the plants left standing under favorable conditions whereby the growth and maturity of the same is facilitated.

The implement consists primarily of a wheel of special construction which is mounted in a frame and from which the frame depends. Said wheel is provided upon its periphery and at intervals with openings through which spring actuated shields are adapted to operate. The rim of the wheel is provided with a broad tread and is adapted to crush down the plant occurring at the intervals between the openings, and plows are provided for covering the prostrated plants, the said shields being adapted to prevent the plows from casting earth against the plants left standing.

Figure 1 is a perspective view of the cotton chopper. Fig. 2 is a side elevation of one form of wheel used in the chopper. Fig. 3 is a side elevation of the modified form of wheel used in the chopper, and Fig. 4 is a perspective view of the shield used in the chopper.

The implement consists of the wheel 1 which is provided at its periphery with a series of openings 2 spaced at equal intervals apart. The spokes 3 connect the rim of the wheel 1 with the hub 4 and the braces 5 connect the intermediate portions of the spokes 3 with the rim of the wheel 1. The axle 6 passes through the hub 4 and is journaled at its ends in the brackets 7. The said brackets 7 support the frame 8 which is located below the center of the wheel 1 and consequently, is suspended from the same. The frame 8 is provided with handles 9 and plows 10. The shields 11 are located in the openings 2 and are adapted to slide longitudinally therein.

The said shields have portions which form their lateral and rear sides and are open in front. The coil springs 12 are mounted upon the spokes 3 and engage the arms 13 attached to the shields and are under tension with a tendency to hold the shields away from the center of the wheel.

In the form of the invention as shown in Figs. 1 and 2 the rim of the wheel 1 is shown as being circular, while in the form of the invention as shown in Fig. 3 the rim of the wheel 1 is shown as being polygonal with the openings 2 located at the apices of the angles. Either form of wheel rim may be employed as conditions may require as the angular rim will depress the earth to a greater extent about the plants left standing than the circular rim will for the reason that in order for the center of the wheel to pass over the apex while the latter is in contact with the ground the said center must be slightly elevated which is not the case where a circular rim is employed. In either instance the wheel rim is provided with a broad tread.

The operation of the implement is as follows:—As it is drawn along a row of standing plants the rim of the wheel will come in contact with the plants at intervals and break them down while at other intervals the plants in the row will stand up through the openings 2 as they approach the ground. The outer ends of the shields 11 also come in contact with the surface of the ground and are pushed in toward the center of the wheel 1 against the tension of the springs 12. As the shields 11 move within the inner side of the wheel rim they protect the plants from earth which is cast up by the plows 10 while the plants that are broken down are covered by earth cast up by the said plows. As the opening 2 through which the standing plants are located is about to leave the said plants the tension of the spring 12 comes into play and holds the outer end of the shield 11 in contact with the ground and thus the standing plants are protected from the earth cast up by the plows 10 until the implement has passed entirely beyond the same. Thus, it will be seen that a simple and an effective implement is provided for destroying plants at intervals along the row and leaving plants standing at other intervals under circumstances calculated to rapidly enable the same to advance to maturity.

Having thus described my invention what I claim as new and desire to secure by Letters-Patent is:

1. An implement of the character indicated comprising a wheel provided with openings in its periphery, spring actuated shields located in said openings and plows carried by the implement.

2. An implement as described comprising a wheel provided with openings in its periphery, spokes leading from the center of the wheel to the openings in the rim thereof, shields slidably mounted in the openings and being guided by the spokes, springs for operating the shields, and plows carried by the implement.

3. An implement as described comprising a wheel provided with openings in its periphery, slidable shields located in the openings, brackets depending from the center of the wheel, a frame supported by said brackets below the center of the wheel and plows carried by the frame.

4. An implement as described comprising a polygonal wheel having openings at the apices of its angles shields slidably mounted in said openings and plows attached to the implement.

In testimony that I claim the foregoing as my own, I have hereto affixed my signature in the presence of two witnesses.

WILLIAM B. DAVIS.

Witnesses:
  J. M. FLETCHER,
  W. M. CLARK.